Figure 1:
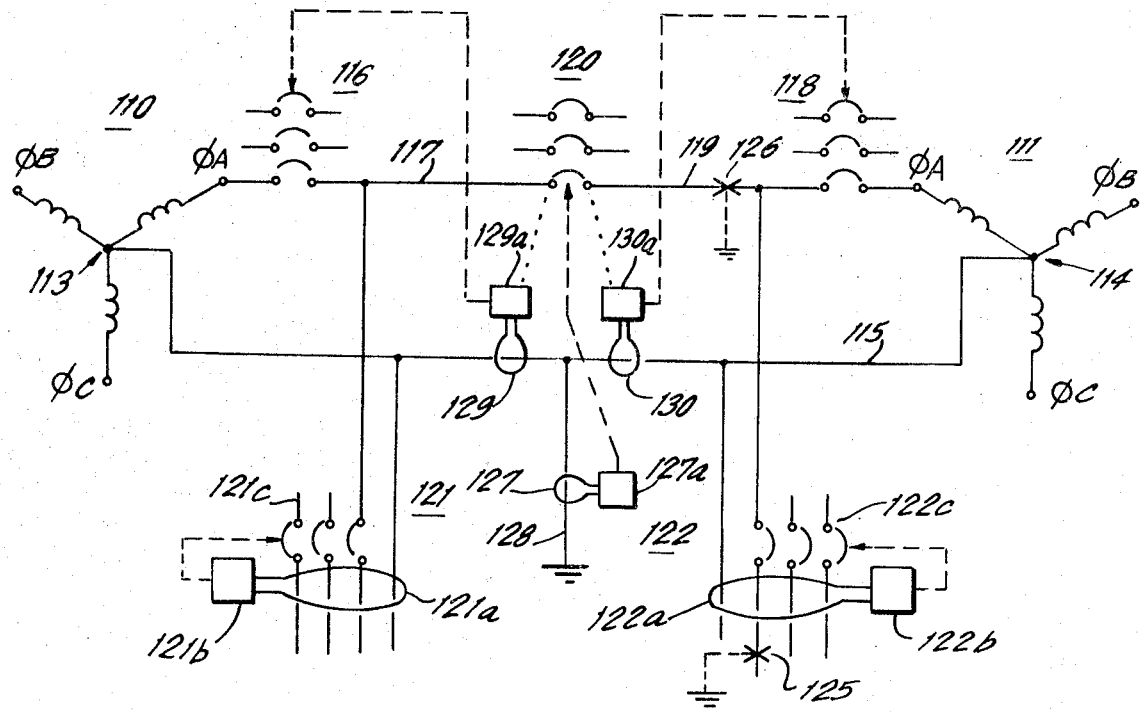

United States Patent

[11] 3,558,981

| [72] | Inventor | Stanley E. Zocholl<br>Holland, Pa. |
|---|---|---|
| [21] | Appl. No. | 832,978 |
| [22] | Filed | June 13, 1969 |
| [45] | Patented | Jan. 26, 1971 |
| [73] | Assignee | I-T-E Imperial Corporation<br>Philadelphia, Pa.<br>a corporation of Delaware |

[54] GROUND RELAY SYSTEM FOR MULTIPLE SUBSTATION PROTECTION
9 Claims, 2 Drawing Figs.

[52] U.S. Cl. .................................................. 317/18,
307/85; 317/26, 317/33
[51] Int. Cl. .................................................. H02h 7/26
[50] Field of Search .......................................... 317/26, 18,
27, 33; 307/20, 85

[56] References Cited
UNITED STATES PATENTS
3,259,802  7/1966  Steen............................. 317/18X
3,505,566  4/1970  Conrad.......................... 317/18

*Primary Examiner*—James D. Trammell
*Assistant Examiner*—Harry E. Moose, Jr.
*Attorney*—Ostrolenk, Faber, Gerb & Soffen ABSTRACT: A ground relay system for multiple substation protection employing a plurality of current transformer sensors. In a three-phase electrical system, one such current transformer is connected to sense the current flow from ground to the common neutral conductor for the multiple sources employed and serves to trip a circuit breaker connecting these multiple sources in a summing relationship when a ground fault is indicated. At the same time, the remaining current transformers serve to sense the current flow in the neutral conductor of the system and relay circuits activated thereby are conditioned by the operation of the first such current transformer to trip the circuit breaker or breakers associated with that portion of the system in which a ground fault is present.

PATENTED JAN 26 1971 3,558,981

INVENTOR.
STANLEY E. ZOCHOLL

BY

OSTROLENK, FABER, GERB & SOFFEN
ATTORNEYS

GROUND RELAY SYSTEM FOR MULTIPLE SUBSTATION PROTECTION

This invention relates to ground relay systems which detect the presence of a phase-to-ground short circuit and which operate a three-phase circuit breaker tripping coil at a rate which is inversely proportional to the magnitude of the short circuit-to-ground current. More particularly, this invention relates to an extension of the ground relay system disclosed in pending application Ser. No. 657,828, filed Aug. 2, 1967, now U.S. Pat. No. 3,505,566.

The ground relay system of that Ser. No. 657,828 application is a system which indicates the presence of a grounded condition in a three-phase environment comprising one conductor for each phase of the system and a neutral conductor. Under normal operating conditions, the currents flowing through each phase plus the current flowing through the neutral conductor yields a resultant current of zero. A current transformer serves to sense the existence of a ground condition by detecting the resultant current flow in the system to be other than zero and to provide an output indication of that fact. That indication, in the form of a resultant output current, is coupled to a solid-state relay and associated devices which operate to trip a three-phase circuit breaker coupled to the system to prevent any damage from befalling the three phases employed. The elapsed time of the tripping operation is there described as being inversely proportional to the magnitude of the short circuit-to-ground current. In this way, a very short time elapses before protection is had where a large phase-to-ground current exists and where greater time elapses before protection is afforded where the phase-to-ground short circuits are of smaller amplitude.

The present invention is an extension of that described in the Ser. No. 657,828 application, now U.S. Pat. No. 3,505,566, in the sense that it provides protection in a multiple substation environment. That is, whereas the invention of the above identified application serves to afford protection in an environment where a single three-phase energy source provides the operating voltage for an electrical system, the invention of the instant application is applicable in an environment where two or more three-phase sources are present to provide the voltages necessary. These three-phase potential sources may be arranged to individually serve separate electrical feeder circuits, or may be combined to provide the necessary voltage for a single such circuit.

Where two such substations are employed, for example, a three-phase circuit breaker is employed to connect or disconnect (as the case may be) the corresponding phases of the two sources. Two such breakers would be used in a three-substation environment, on the other hand, with one of the breakers serving to connect the first and second energizing sources and with the second such breaker serving to connect the second and third three-phase source. As will become clear hereinafter, any ground fault condition existing in a feeder circuit served by either or all of these multiple substations can be protected by the ground relay system of the type described in the Ser. No. 657,828 application, now U.S. Pat. No. 3,505,566. However, it will be seen that it is more difficult to protect against a ground fault existing on the electric power bus within the grounded sheet metal housing enclosing the sources of electrical energy.

In the ground relay system of the present invention, this latter ground fault is detected and used to disconnect the three-phase energizing sources cooperating to provide the electric power to the feeder circuit. More specifically, where the sources combine to provide the requisite energy to a plurality of feeder circuits, the system of the invention serves to disconnect that energizing source in which the ground fault occurs while permitting the properly operating source to continue providing voltages to its respective feeder circuits. To accomplish this, an auxiliary current transformer serves to detect the presence of a ground fault somewhere within the system and to trip the circuit breaker connecting the various sources employed, to aid in isolating the fault. This tripping, at the same time, conditions relay circuits activated by current transformer sensors associated with each source employed so as to respond to ground fault conditions detected by such sensors. This relay circuit is of the type disclosed in the above-identified application; however, it is modified according to the present invention to include a contact switch which serves to short circuit the relay under normal, nonfault operating conditions and to remove the short circuit, permitting relay operation enabling a subsequent tripping action under the ground fault operating condition.

It is one object of the instant invention, therefore, to provide a ground relay system for multiple source substation protection wherein ground fault currents of relatively low magnitude cause tripping of a circuit breaker after a substantially long predetermined time delay and wherein ground fault currents of increasing magnitude cause tripping of the circuit breaker over decreasing time delays.

It is another object of the invention to provide such a system wherein only the circuit breaker associated with the energy source in which a ground fault exists is tripped.

It is a further object of the invention to provide a ground relay system employing circuits of the type described in pending application Ser. No. 657,828, now U.S. Pat. No. 3,505,566.

Figure 2:
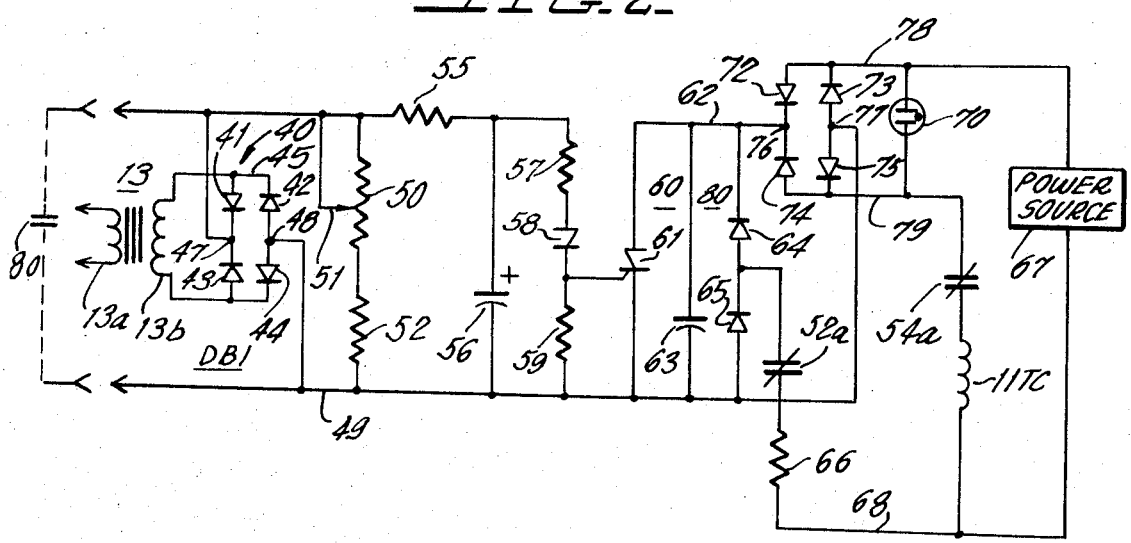

These and other objects of the present invention will become apparent from the following description and drawing in which:

FIG. 1 is a simplified schematic diagram of a ground relay system embodying the principles of the present invention; and FIG. 2 is a schematic circuit diagram of a static relay circuit useful in the ground relay system of FIG. 1.

DESCRIPTION AND OPERATION OF THE GROUND RELAY SYSTEM OF THE PRESENT INVENTION

Before considering the description and operation of the ground relay system of the present invention, a brief description of the protection system disclosed in Ser. No. 657,828 will be in order. In that application, a three-phase power distribution system is shown and comprises three conductors, one for each of the three phases of the system, and a neutral conductor. Each of the three phases are protected against fault conditions by means of a three-phase circuit breaker. As is well known in the art, the circuit breaker may be instantaneously tripped when a fault current condition is sensed by suitable sensing means, as well as being mechanically operable to the open position for maintenance and/or inspection purposes.

A current transformer or ground sensor is provided and includes a winding of at least one turn encircling the three-phase conductors and the neutral conductor so as to form a window for sensing the resultant current flow therethrough. Under normal operating conditions, the current transformer sensor has a zero output since the vector summation of currents in the three-phase power distribution network is zero. Therefore, there is no resultant current flow through the sensor.

If a fault to ground occurs, the vector summation of the currents in the three conductors and in the neutral conductor does not equal zero. The resultant current flow through the window of the sensor is the ground fault current and causes the sensor to produce an output current related to the resultant current by the turns ratio of the transformer. The output current of the sensor is then converted to a voltage indication by means of a further transformer and solid-state relay circuit to a current for activating the trip coil of a protective circuit breaker. Such a further transformer and solid-state relay are shown in FIG. 2 of the present drawings, with the trip coil of the breaker being indicated by the reference notation 11TC. That portion of the FIG. 2 drawing which corresponds to similar components in the previously-referred-to application are shown by the solid lines and bear the same reference numerals as used therein.

Referring now to FIG. 1, the ground relay system there shown depicts a double ended substation in which two three-phase energy sources 110 and 111 are indicated. Each substation is a three-phase, four-wire configuration with the reference notations 113 and 114 representing the secondary windings of the two power transformers feeding the low voltage bus. The phase A conductor and the neutral bus 115 are shown complete, while only parts of the phase B and phase C conductors are shown. As indicated in the drawing, the neutral bus 115 is connected to ground at the electrical midpoint between the two power transformers 110 and 111.

For the double ended substation environment shown, three three-phase circuit breakers are employed. However, for the sake of clarity, only the connection with the phase A conductor is indicated. One such circuit breaker 116 is provided to connect the phase A winding of energy source 110 and its main bus 117, while a second such breaker 118 is provided to connect the phase A winding of the energy source 111 to its associated main bus 119. The third three-phase circuit breaker 120 is a tie breaker arranged to provide the connection of the main buses 117 and 119 so that any feeder circuit load connected to either bus may be supplied by the energy of both sources 110 and 111. Such feeder circuits are indicated by the reference notations 121 and 122, with the feeder circuit 121 being coupled to the main bus 117 and with the feeder circuit 122 being coupled to the main bus 119. Alternatively, the third circuit breaker 120 may be opened so that each feeder circuit 121, 122 is provided only with the energy of the source with which it is connected.

For purposes of illustrating the operation of the present invention, it will be assumed that the feeder circuits 121 and 122 of the drawings are respectively provided with the energies of the three-phase sources 110 and 111. Each such feeder circuit has associated with it a current transformer or ground sensor (121a, 122a) encircling the neutral conductor and respective phase conductors of the three-phase system powered by the sources 110, 111. Each current transformer is coupled to a solid-state relay of the type described in the Ser. No. 657,828 application (121b, 122b) which operates in the manner described therein to trip the three-phase circuit breakers (121c, 122c) upon an indication of a fault being present in either or both feeder circuits 121, 122.

It will be appreciated, however, that more than two energy sources of the type herein described may be joined in this manner, and in those configurations additional ground fault protection systems for the individual feeder circuits will also be included.

Considering the system of FIG. 1, once again, and remembering the cooperative operation of the current transformer, solid-state relay and associated three-phase breaker as was previously described with respect to the application Ser. No. 657,828 application, now U.S. Pat. No. 3,505,566, it will be seen that any short circuit to ground condition existing in the feeder circuits 121, 122 will be sensed by the current transformer thereof and ultimately caused to develop a current to trip the respective three-phase circuit breakers 121c, 122c. Such a short circuit to ground fault is indicated at point 125 in the feeder circuit 122. Operation in this respect is, therefore, substantially no different from that described in the above noted pending application.

However, a more difficult fault to clear is the short circuit-to-ground condition which is present on either or both of the main buses 117 and 119. The operation of the ground relay system of the invention in the case of only one such fault condition will herein be discussed, as the effect of a second, third or fourth such fault in a multisubstation environment will only be cumulative.

Such a ground fault for the double-ended substation arrangement of FIG. 1 is indicated at the point 126 on the main bus 119. In order to locate that portion of the system where abnormal operation results and to isolate it from the normal operating portion of the system, the arrangement of FIG. 1 employs three additional current transformers or similar such ground sensors together with solid-state relays, preferably of the type shown in the Ser. No. 657,828 application, now U.S. Pat. No. 3,505,566. As indicated in the drawings of FIG. 1: one such current transformer 127 senses the short circuit current flowing from ground to the neutral conductor 115 of the ground relay system along a conductor strap 128. A second such current transformer 129 is arranged to sense current flow in that portion of the neutral conductor 115 positioned between the energy source 110 and the strap conductor 128, while the third current transformer 130 is positioned to sense current flow in that portion of the neutral conductor connected between the three-phase energy source 111 and the conductor 128. In response to an indication of current flow developed by either or all of these current transformers, the solid-state relays 127a, 129a, 130a operate to develop a current to trip the respective three-phase circuit breaker 120, 116, 118. As will be readily apparent, with all circuit breakers 116, 118 and 120 closed, a short circuit fault at point 126, causes ground current to enter the center of the neutral conductor 115, to divide between the conductor portion on either side of the strap conductor 128 and to return to the fault point 126 partly through breaker 116 and partly through breaker 118.

As will be seen, the first step in locating and isolating any fault present in the ground relay system is to open the tie circuit breaker 120 so as to route the full ground current to the faulted side. This is accomplished in FIG. 1 of the drawings by the operation of the current transformer 127 and its solid-state relay 127a, which operate in response to any ground fault present on either of the main buses 117 and 119. It is also accomplished by selecting the delay time of solid-state relays 129a and 130a to be longer than the delay time of solid-state relay 127a so as to prevent the circuit breakers 116 and 118 from instantaneously opening in response to the fault without providing any indication as to the whereabouts of fault location for purposes of correction. However, it will be noted that because of these selected time delays, considerable fault current can be carried across the neutral conductor 115 and produce current indications in the relays 129a and 130a which exceed the desired minimum operating current of those devices.

This problem is corrected by recognizing that the solid-state relays 129a and 130a need trip the three-phase circuit breakers 116 and 118 only when the tie circuit breaker 120 is open. Therefore, the system of the present invention envisions the incorporation of an auxiliary switch on the circuit breaker 120 used to control the operation of the relays 129a and 130a. Such connections are indicated by the dotted line shown in FIG. 1, to be distinguished from the dashed lines connecting the individual solid-state relays from their associated circuit breaker arrangements.

FIG. 2 shows the connection of this auxiliary contact with the solid-state relays of the type employed in a preferred embodiment of the invention and as described in the Ser. No. 657,828 application, now U.S. Pat. No. 3,505,566. The auxiliary switch is shown in dotted lines at the left by the reference notation 80, with the circuit being identical to that in the referenced application except for the bringing out of the DC terminals 47 and 48 of the full-wave rectifier bridge DB1 for further connection.

With the ground system of FIG. 1 in its normal, nonfault operation condition, the tie breaker 120 is closed. This has the effect of closing the auxiliary switch 80 so as to short out the solid-state relays 129a and 130a. This has no deleterious effects to the operation of the system as no current would be developed to trip the circuit breakers 116 and 118 during this normal operation. When a ground fault condition exists on either or both of the main buses 117 and 119, the tie breaker 120, as described, is tripped to effectively open the auxiliary switch 80. The solid-state relay 129a and 130a is then permitted to operate in the manner previously described. Noting that tripping of the tie breaker 120 open-circuits the ground current path to the left of the strap conductor 128, it will be seen that no ground fault current will be sensed by the current transformer 129. Thus, the circuit breaker 116 will remain closed. However, since ground fault current continues to flow through the current transformer 130 due to the presence of the short circuit at point 126, the current transformer 130 and the conditioned relay 130a will cooperate to develop the current to trip the breaker 118. Upon so tripping that breaker, it will be seen that an indication is provided to the effect that the fault exists on the main bus 119 rather than on the main bus 117. This effectively locates the position of the ground fault and enables easy correction thereof.

It will be seen, in addition, that by maintaining the circuit breaker 116 closed upon the occurrence of the ground fault at point 126, continuous voltage can be provided the feeder circuit 121 of the system. This is a significant advantage over prior art arrangements where the entire system would shut down upon the occurrence of a ground fault. There, all power to the many feeder circuits employed would be cut off, whereas the instant invention only cuts off the power associated with the energy source in connection with which the fault occurs.

To further locate the fault as being at the point 126 on the main bus 119, the delay time of the solid-state relay 122b associated with feeder circuit 122 is selected to be less than that of the solid-state unit 127a. If the breaker 122c remains closed while breaker 118 is open, the indication positively points to a fault at the bus 119. It will be noted in this respect that if the opposite were the case—namely that the delay time of the solid-state relay 122b were greater than that of the solid-state relay 127a—then a ground fault condition at point 125 and not at point 126 could lead to the opening of the breaker 118 as ground current would continue to flow, even after opening the tie breaker 120, through the current transformer 130. However, selecting the respective time delays of these units in the manner described above prevents such an occurrence.

It will therefore be seen that the combination of the three-current transformer and solid-state relay arrangements described above effectively serves to isolate and locate any ground fault present on the main bus of the multiple substation arrangement. While permitting continued operation of the properly operating portions of the arrangement a single current transformer and solid-state arrangement as 127 and 127a will, alone, isolate ground current from the circuit breaker 116 upon the occurrence of a ground fault at point 126, those units by themselves will be unable to open the circuit breaker 118 and the ground fault current will continue to flow. Similarly, by employing only the current transformers 129 and 130 and their respective solid-state relays, both circuit breakers 116 and 118 will be opened upon the indication of current flow through the neutral conductor 115 but no information as to fault location will be provided and all service from the substation will be interrupted. By the combination of the two arrangements so as to employ all three-current transformers and solid-state relays, on the other hand, effective isolation and location of the ground fault point is provided.

Generation of the current within the solid-state relays of the ground system to trip its associated circuit breaker is controlled, as seen in FIG. 2 by a Shockley four-layer diode 58. This diode will fire upon the voltage across a capacitor 56 reaching a predetermined level. As is fully described in the Ser. No. 657,828 application, now U.S. Pat. No. 3,505,566, this voltage across the capacitor 56 is reached in a time dependent upon the resultant current sensed by the current transformer of the relay system. As the resultant current sensed by the transformer increases, the voltage developed by the bridge network DB1 will be greater and the voltage needed to fire the Shockley diode 58 will be reached in a shorter period of time. It is in this manner that the inverse time relationship of the solid-state relay of the present invention is effected. Namely, when the fault condition is greater, the necessary current to trip the relay will be developed by the solid-state unit in a shorter period of time than when the fault condition is less.

I claim:

1. A system for detecting ground faults in a multistation multiphase power distribution network having a common neutral conductor comprising:

first and second multiphase alternating current electric power buses;

first switching means for connecting said first electric power bus to a first source of multiphase alternating current energy, said first switching means being equipped with a first normally deenergized trip coil and being openable to disconnect said first bus from said first source upon energization of said first trip coil;

second switching means for connecting said second electric power bus to a second source of multiphase alternating current energy, said second switching means additionally being equipped with a second normally deenergized trip coil and being openable to disconnect said second bus from said second source upon energization of said second trip coil;

third switching means for connecting said first electric power bus to said second electric power bus, said third switching means also being equipped with a third normally deenergized trip coil and being openable to disconnect said first bus from said second bus upon energization of said third trip coil;

an electrical connection from said common neutral conductor to a point of alternating current ground potential;

means including a first sensor inductively coupled to said electrical connection for generating a current to effect energization of said third trip coil upon the occurrence of a ground fault on one of said electric power buses;

first normally disabled means including a second sensor inductively coupled to said common neutral conductor at a point intermediate said first alternating current energy source and said electrical connection for generating a current, when enabled, to effect energization of said first trip coil upon the occurrence of a ground fault on said first electric power bus;

second normally disabled means including a third sensor inductively coupled to said common neutral conductor at a point intermediate said second alternating current energy source and said electrical connection for generating a current, when enabled, to effect energization of said second trip coil upon the occurrence of a ground fault on said second electric power bus; and with the generation of current to effect energization of said third trip coil also serving to enable said first and second normally disabled means.

2. The system as defined in claim 1 wherein said first, second and third switching means each comprise a multiphase circuit breaker assembly.

3. The system as defined in claim 1 wherein said first, second and third sensors each comprise a current transformer.

4. The system as defined in claim 1 wherein each of said current generating means effecting energization of a trip coil includes a relay circuit operable to generate a current of sufficient magnitude to energize its respective trip coil at a time later than the occurrence of a ground fault on one of said electric power buses by an amount proportionately related to the magnitude of said fault.

5. The system as defined in claim 4 wherein said first and second normally disabled means are disabled by a contact short circuiting the input terminals of the associated relay circuit and wherein said generation of current to effect energization of said third trip coil disconnects said short circuiting contact.

6. The system as defined in claim 5 wherein there is additionally included at least one multiphase alternating current feeder circuit coupled to one of said first and second electric power buses and to said common neutral conductor, and means for disabling said feeder circuit upon the occurrence of a ground fault on one of the conductors thereof.

7. The system as defined in claim 6 wherein the time lapse in disabling said feeder circuit upon the occurrence of a ground fault on one of the conductors thereof is less than the time lapse in disabling said third switching means upon the occurrence of a ground fault on one of said electric power buses.

8. The system as defined in claim 7 wherein the time lapse in disabling said third switching means upon the occurrence of a ground fault on one of said electric power buses is less than the time lapse in disconnecting said first and second buses from said first and second sources upon the occurrence of a ground fault on said first and second power buses, respectively.

9. A system for detecting ground faults in a multistation, multiphase power distribution network having a common neutral conductor comprising:

first and second multiconductor electric power buses;

first and second switching means for respectively connecting said buses to two different sources of multiphase alternating current energy, with each switching means being openable to disconnect the associated bus and source;

third switching means for interconnecting said buses, with said third switching means being openable to disconnect said buses;

an electrical connection from said common neutral conductor to a point of alternating current ground potential;

tie relaying means coupled to said third switching means and responsive to ground current flowing through said electrical connection for disabling said third switching means to disconnect said first and second buses; and first and second normally disabled relaying means coupled to said first and second switching means respectively, with each responsive to ground current flowing through said neutral conductor for disabling at least one of said first and second switching means in response to the disabling of said third switching means.